United States Patent
Nakagome et al.

[19]

[11] Patent Number: 5,917,541
[45] Date of Patent: Jun. 29, 1999

[54] COLOR SENSE MEASURING DEVICE

[75] Inventors: Kouji Nakagome, Gyoda; Haruo Kato, Sapporo, both of Japan

[73] Assignee: Advantest Corporation, Tokyo, Japan

[21] Appl. No.: 08/765,632

[22] PCT Filed: Apr. 26, 1996

[86] PCT No.: PCT/JP96/01147

§ 371 Date: Apr. 25, 1997

§ 102(e) Date: Apr. 25, 1997

[87] PCT Pub. No.: WO96/34259

PCT Pub. Date: Oct. 31, 1996

[30] Foreign Application Priority Data

Apr. 26, 1995 [JP] Japan .................................. 7-102333

[51] Int. Cl.$^6$ .................................................. H04N 7/18
[52] U.S. Cl. ............................. 348/93; 348/94; 348/187; 348/188; 386/38; 382/162
[58] Field of Search ................................ 348/27, 28, 29, 348/32, 34, 91, 92, 93, 94, 187, 188, 193; 386/38; 358/906, 909.1; 382/162, 167; 209/580; H04N 7/18

[56] References Cited

U.S. PATENT DOCUMENTS

| | | | |
|---|---|---|---|
| 4,965,663 | 10/1990 | Sasaki | 358/80 |
| 4,970,584 | 11/1990 | Sato et al. | 358/75 |
| 5,159,185 | 10/1992 | Lehr | 250/205 |
| 5,355,163 | 10/1994 | Tomitaka | 348/234 |
| 5,495,429 | 2/1996 | Craven et al. | 364/526 |
| 5,533,628 | 7/1996 | Tao | 209/580 |
| 5,799,105 | 8/1998 | Tao | 382/167 |

FOREIGN PATENT DOCUMENTS

| | | |
|---|---|---|
| 2-73122 | 3/1990 | Japan . |
| 6-118017 | 4/1994 | Japan . |
| 6-29784 | 4/1994 | Japan . |
| 7-95424 | 4/1994 | Japan . |
| 6-187454 | 7/1994 | Japan . |
| 6-76920 | 9/1994 | Japan . |
| 6-314338 | 11/1994 | Japan . |
| 6-341902 | 12/1994 | Japan . |
| 6-350861 | 12/1994 | Japan . |
| 7-64950 | 3/1995 | Japan . |

*Primary Examiner*—Bryan Tung
*Assistant Examiner*—Tung Vo
*Attorney, Agent, or Firm*—Staas & Halsey

[57] ABSTRACT

An input section of a color sense measuring device includes a solid-state camera image-sensing an object to be measured and a frame memory storing output information from the solid-state camera. The output information of the solid-state camera read out of the frame memory is fed to a hue/saturation/lightness transform part in a color sense measuring section for transformation into hue image information, saturation image information and lightness image information for use in measuring the color sense of the object to be measured. Based on the image information output from the color sense measuring section, a feature extract/quantification section extracts a feature value for measuring the color sense of the object and a color sense analysis section judges the color sense of the material of the object on the basis of the feature information output from the feature extract/quantification section, while at the same time the feature information is supplied to an image processing/display part for display.

8 Claims, 2 Drawing Sheets

COLOR SENSE MEASURING DEVICE

FIELD OF THE INVENTION

The present invention relates to a color sense measuring device and, more particularly, to a color sense measuring device which carries out a synthetic measurement of the color sense of the surface of an object to be measured on the basis of the results of measurements of the hue, saturation and lightness of the object surface.

BACKGROUND OF THE RELATED ART

There is an increasing demand for higher quality, higher resolution and higher definition in the recognition or evaluation of color of an object to be measured (hereinafter, also, referred to as DUT), such as displays, cosmetics, printed matters, paints and other objects that are evaluated or perceived in terms of colors, and hence the measurement of the color sense of a DUT is now becoming more and more important. Here, by the term "color sense", in this description, is intended the feel or impression of the quality (attribute, property, nature, quality of a material, etc.) of a DUT by the human visual perception of color, gloss (or glaze), texture and pattern of the DUT. However, there has not yet been developed up to now a color sense measuring device for measuring the hue, saturation and lightness of a DUT and determining or evaluating synthetically or totally the color sense that a person perceives through his eyes from the DUT surface with high accuracy on the basis of the results of measurements of the DUT.

In general, the color of a DUT is measured by obtaining a spectral distribution of the DUT using a spectrophotometer. The spectrophotometer comprises an optical section and a measuring section. The optical section is constructed by a spectroscope for generating monochromatic light and a part for measuring the intensity of reflected light. The measuring section performs calculation processing of measured signals.

The results measured by the spectrophotometer are displayed, for example, as a graph showing the relationship between the wavelength and the intensity of light represented on the abscissa and ordinate, respectively. This graphic representation is commonly referred to as a spectral distribution.

The color of a material can be represented or displayed usually in terms of three attributes of the material, i.e., hue, lightness and saturation. The relationships between these attributes and the spectral distribution can be known by examining the spectral distributions of hue difference, lightness difference and saturation difference using a color chart and a spectrophotometer.

A visual comparing method or a mixed color matching method is a visual inspection method for comparing a specimen with a systematized color scale by the visual sense to measure and evaluate the color of the specimen.

A stimulus direct-reading method and spectrocolorimetric method are a method for measuring a color by use of a calorimetric instrument manufactured in conformity to the requirements stipulated in JIS (Japanese Industrial Standard) Z 8722 (Method for Measuring Colors of Objects) or the like.

The spectrocolorimetric method is a method for measuring the spectral reflectance or spectral transmittance of the color of a DUT, performing a calculation processing by a prescribed method, and determining a systematized coordinates in space of the color (as to the above, refer to "Measurements of Colors" published by Society of Input Standards (Nyuryoku Kikaku Kyokai)).

The above-mentioned visual comparing method and the mixed color matching method are a method for evaluating the color of an object by visual inspection, and hence they are required to eliminate a defect that the evaluation varies with individual operators or inspectors and/or measuring environments.

The stimulus direct-reading method and spectrocolorimetric method are a method for performing a photoelectric colorimetry using a photoelectric tube unlike the visual colorimetry, and hence it is possible to measure or evaluate colors with relatively high accuracy because they do not rely upon the naked eye. However, it is required to perform measurements or evaluations of colors with higher accuracy and measurements or evaluations of colors in the absolute value with higher accuracy. That is, the stimulus direct-reading method, which is capable of reading tristimulus values from a meter using a photoelectric colorimeter, evaluates the color of a specimen (DUT) by reading tristimulus values of both of a sample and the specimen. On the other hand, the spectrometric method can perform measurements of colors with high accuracy as well as measurements of colors in the absolute values with high accuracy. However, these methods have a problem in the measurement of dark colors (as to the above, refer to page 94 of "Common Sense of Colors" published by Society of Japanese Standards (Nippon Kikaku kyokai)).

Further, in the visual colorimetry, it is necessary to prevent the results of measurements from being influenced by surface conditions of a sample and a DUT, the size of the DUT, the arrangement of the sample and the DUT, and other conditions for the measurements. It is also necessary to avoid that the surface condition of the DUT is affected and changed by its temperature and humidity so that a measurement error is caused.

Heretofore, it is intended that the color of a DUT is measured by such methods as mentioned above and the measured results are properly processed to measure or determine the color sense of the DUT. However, it is impossible to obtain the results of colorimetry of the DUT with high accuracy.

SUMMARY OF THE INVENTION

It is therefore an object of the present invention to provide a color sense measuring device which is able to solve the above-mentioned problems of the prior art.

According to the present invention, there is provided a color sense measuring device which comprises: an input section having a solid-state camera for taking an image of an object to be measured, and a frame memory for storing output information from the solid-state camera; a color sense measuring section having a hue/saturation/lightness transform part for transforming the output information of the solid-state camera transmitted from the frame memory of the input section into hue image information, saturation image information and lightness image information used in measuring the color sense of the object to be measured and outputting them; a feature extract/quantification section for extracting a feature value used in measuring the color sense of the object on the basis of the image information outputted from the color sense measuring section; a color sense analysis section for judging the color sense of the quality of the material of the object on the basis of the feature information outputted from the feature extract/quantification section; and an image processing/display section for processing the feature information outputted from the feature extract/quantification section and displaying the processed results.

The input section further comprises a standard white light source, and the color sense measuring section comprises the hue/saturation/lightness transform part, a 2D (two-dimensional) fast Fourier transformation (FFT) part and a gloss (or glaze) calculating part. The color sense measuring section may be further provided with a chromaticity distribution transform part and a 3D (three-dimensional) CIE chromaticity diagram histogram generating part.

The feature extract/quantification section comprises a power feature value calculating part for extracting a power feature value from the output information of the 2D fast Fourier transformation part, a fractals degree calculating part for extracting a degree of the fractals from the output information of the hue/saturation/lightness transform part, a gloss degree feature value calculating part for extracting a degree of the gloss from the output information of the hue/saturation/lightness transform part, and a texture degree calculating part for extracting a degree of the texture from the output information of the hue/saturation/lightness transform part.

In addition, the device of the present invention may have a temperature sensor, a humidity sensor, or a device added thereto which monitors and stores environmental conditions at the time of measuring the color sense.

DETAILED DESCRIPTION OF THE PREFERRED EMBODIMENT

An embodiment of the present invention will now be described in detail with reference to the accompanying drawings.

Figure 1:
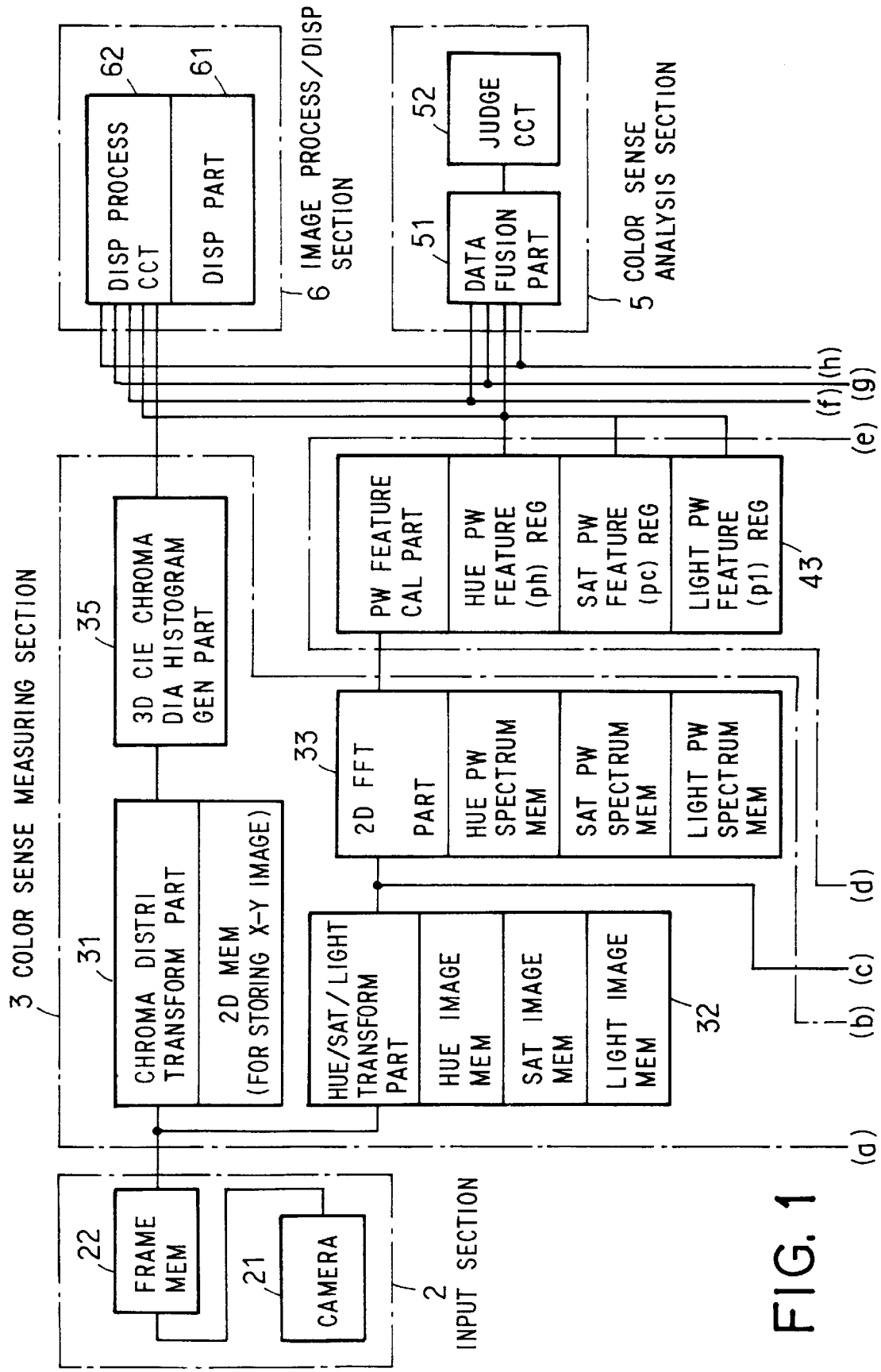
FIG. 1 is a block diagram illustrating one part of an embodiment of the color sense measuring device according to the present invention.
Figure 2:
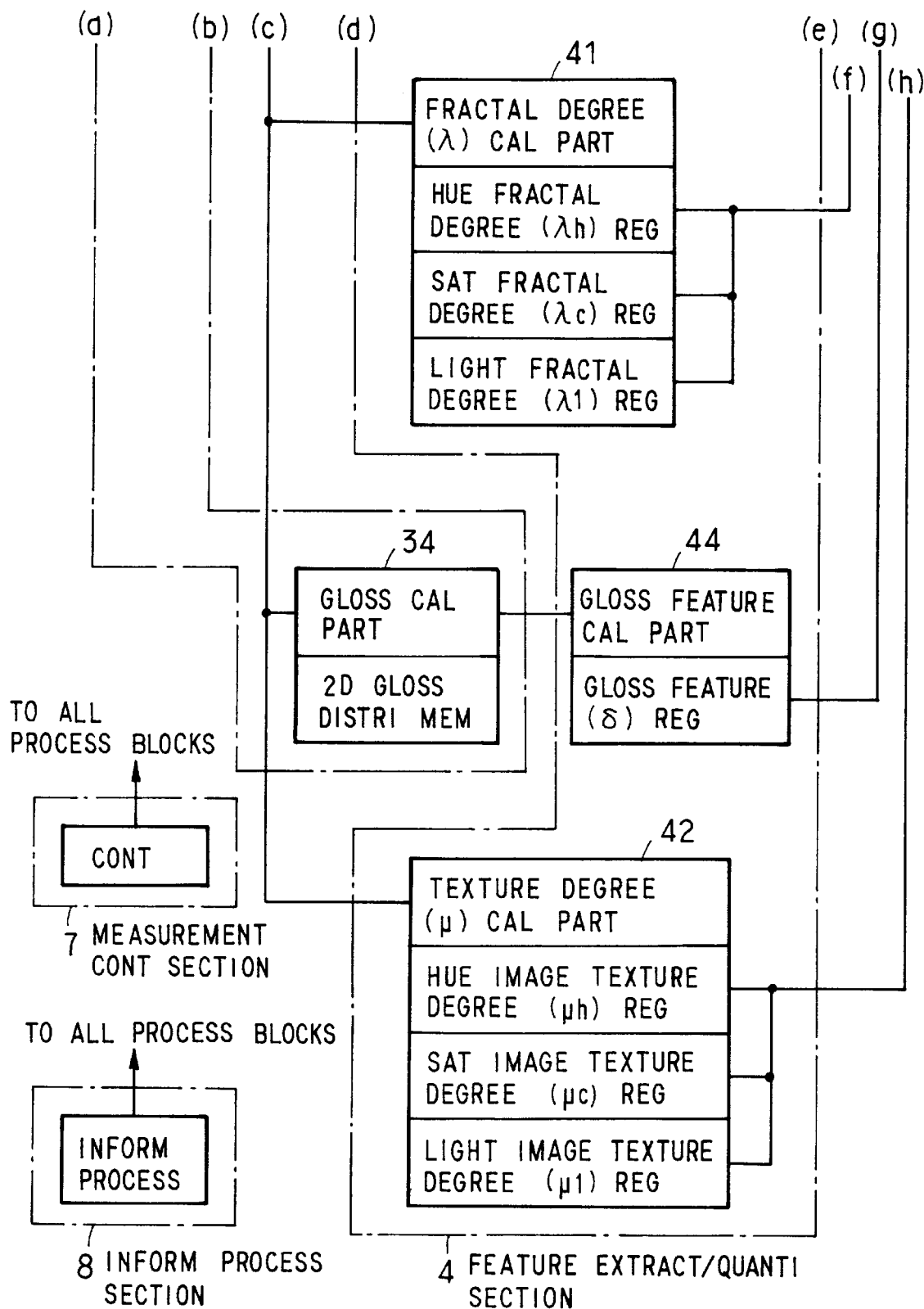
FIG. 2 is a block diagram illustrating the other remaining part of the embodiment of the color sense measuring device according to the present invention.

FIGS. 1 and 2 form one drawing by interconnecting their corresponding reference characters (a) through (h) in which an embodiment of the color sense measuring device according to the present invention is shown. The color sense measuring device of this embodiment comprises an input section 2, a color sense measuring section 3, a feature extract/quantification (quanti) section 4, a color sense analysis section 5, an image processing/display (image process/disp) section 6, a measurement control (cont) section 7, and an information processing (inform process) section 8. The color sense measuring device measures the hue, saturation and lightness of an object to be measured (DUT) and synthetically carries out a measurement in absolute value of the feel or impression of the quality (i.e., the color sense) of the surface of the DUT that a person perceives through his eyes from the color, gloss or glaze, texture and pattern of the DUT as well as an analysis of the color sense.

The input section 2 is constituted by a solid-state camera (camera) 21 and a frame memory (frame mem) 22. The color sense measuring section 3 is constituted by a chromaticity distribution (chroma distri) transform part 31, a hue/saturation/lightness (hue/sat/light) transform part 32, a 2D fast Fourier transformation (FFT) part 33 and a gloss degree calculating (gloss cal) part 34. The feature extract/quantification section 4 is constituted by a fractals degree calculating (fractals degree cal) part 41, a texture degree calculating (texture degree cal) part 42, a power feature value calculating (pw feature cal) part 43 and a gloss degree feature value calculating (gloss feature cal) part 44. The color sense analysis section 5 is constituted by a data fusion part 51 and a judge circuit (judge cct) 52. The image processing/display section 6 is constituted by a display processing circuit (disp process cct) 61 and a display (disp) part 62.

Each section of this embodiment will be described in more detail. The input section 2 has the solid-state camera 21, the frame memory 22 formed by a semiconductor device for storing output information from the solid-state camera 21, and a standard white light source not shown.

The hue/saturation/lightness transform part 32 forming part of the color sense measuring section 3 transforms the output information from the solid-state camera 21 into 2D hue, saturation and lightness images for use in measuring the color sense of a DUT and stores these images in 2D hue, saturation and lightness memories, respectively. The 2D FFT part 33 performs 2D fast Fourier transformation processing of the stored contents of the 2D hue, saturation and lightness memories and stores the resulting 2D power spectra in hue, saturation and lightness power spectrum memories, respectively.

The power feature value or characteristic amount calculating part 43 calculates hue, saturation and lightness power feature values or characteristic amounts ph, pc and pl from the stored contents of the hue, saturation and lightness power spectrum memories, respectively, and stores the calculated features in hue, saturation and lightness power feature registers, respectively.

The fractals degree calculating part 41 calculates a degree of fractals $\lambda$ from the stored contents of the 2D hue, saturation and lightness memories of the hue/saturation/lightness transform part 32 and stores the calculated fractals values $\lambda$ in hue, saturation and lightness fractals registers, respectively.

The gloss degree calculating part 34 calculates a 2D gloss degree distribution image from the stored contents of the 2D hue, saturation and lightness memories of the hue/saturation/lightness transform part 32 and stores the calculated result in a 2D gloss distribution memory. The gloss degree feature value or characteristic amount calculating part 44 calculates a gloss degree feature value $\delta$ from the image data stored in the 2D gloss degree distribution memory of the gloss degree calculating part 34 and stores the calculated gloss degree feature in a gloss degree feature value register.

The texture degree calculating part 42 calculates hue, saturation and lightness texture degrees $\mu h$, $\mu c$ and $\mu l$ from the stored contents of the 2D hue, saturation and lightness memories of the hue/saturation/lightness transform part 32 and stores the calculated texture values in hue, saturation and lightness texture degree registers, respectively.

The data fusion part 51 and the judge circuit 52 of the color sense analysis section 5 have a function by which the hue, saturation and lightness fractals values $\lambda h$, $\lambda c$ and $\lambda l$, the gloss degree feature $\lambda$, the hue, saturation and lightness texture degree values $\mu h$, $\mu c$ and $\mu l$ and the hue, saturation and lightness power feature values ph, pc and pl calculated as described above are combined and fused into one statistic, thereby synthetically measuring the color sense in terms of an absolute value a person perceives about the DUT surface and analyzing the color sense.

The image processing/display section 6 displays the hue, saturation and lightness fractals values $\lambda h$, $\lambda c$ and $\lambda l$, the gloss degree feature δ, the hue, saturation and lightness texture degree values μh, μc and μl and the hue saturation and lightness power feature values ph, pc and pl collectively as a bar graph, for instance, or individually.

Next, a description will be given of the operation of the color sense measuring device of the above configuration according to the present invention.

In the first place, the solid-state camera 21 takes an image of a DUT and converts the image into pieces of image signal data on three primary colors (RGB) of red (R), green (G) and blue (B) light. These pieces of image signal data are stored in the frame memory 22, from which they are sent to the chromaticity distribution transform part 31 and the hue/saturation/lightness transform part 32 which form the color sense measuring section 3.

The chromaticity distribution transform part 31 approximately calculates the XY chromaticity. When the solid-state camera 21 is one that uses three accurate primary colors XYZ, accurate XY chromaticity is calculated. The chromaticity distribution transform part calculates chromaticity for all pixels and generates a 3D CIE diagram in the form of a histogram of each color while plotting the chromaticity in a CIE chromaticity diagram in the 3D CIE chromaticity diagram histogram generating part 35, the 3D CIE diagram being displayed in the image processing/display section 6.

The hue/saturation/lightness transform part 32 calculates hue, saturation and lightness images from the image signals of the three primary colors RGB read out of the frame memory 22 of the input section and stores these images in the hue, saturation and lightness image memories, respectively. The hue, saturation and lightness transform processing can be done using, for example, HLS, HSV and HCV transform schemes, which are suitably selected in accordance with the property of the color of the image to be processed.

The pieces of signal data stored in the hue, saturation and lightness image memories of the hue/saturation/lightness transform part 32 are fed to the 2D FFT part 33, wherein they are subjected to fast Fourier transformation processing, and the resulting power spectra are stored in the hue, saturation and lightness power spectrum memories.

The pieces of data stored in the hue, saturation and lightness power memories are sent to the power feature calculating part 43, wherein they are transformed into hue, saturation and lightness power features ph, pc and pl, and they are stored in the registers respectively corresponding thereto. That is, the stored pieces of data are each transformed by a fixed statistical calculation into a numerical value representing the feature, which is stored in the corresponding register. These numerical values are provided to the data fusion part 51 of the color sense analysis part 5, wherein they are fused together, and the fused data is fed to the judge circuit 52. The numerical values stored in the above-mentioned registers are also fed to the display processing circuit 61 of the image processing/display section 6, wherein they are properly processed for display, and the processed results are displayed as a bar graph or in a similar form on the display 62.

The power spectra, which represent the powers of the hue, saturation and lightness images, are obtained by the fast Fourier transform processing of the hue, saturation and lightness images. It is the power features that mathematically express their statistical distributions and distribution tendencies.

The pieces of signal data stored in the hue, saturation and lightness image memories of the hue/saturation/lightness transform part 32 are simultaneously sent to the fractals calculating part 41 as well, wherein the hue, saturation and lightness fractals values λh, λc and λl are calculated numerically. The thus obtained numerical values are each a value which is obtained by a statistical calculation using the fractals value which is one of properties of each image, and the numerical value indicates the fractals property of the texture pattern of the DUT surface. The fractals value λ mentioned in this specification is defined to mathematically represent the degree of similarity among "texture" images of fine to coarse textures, and the fractals value mathematically expresses the texture of the image and its property.

These numerical values representative of fractals values are provided to the data fusion part 51 of the color sense analysis section 5, wherein they are fused together, and the fused data is fed to the judge circuit 52. At the same time, the numerical values representing the fractals values are fed also to the display processing circuit 6 of the image processing/display section 6, wherein they are properly processed, and the processed results are displayed in the form of a bar graph or the like on the display part 62. While no strict definition has been given of the fractals value, an appropriate fractals value is defined for practical use, taking into account the property of the image being handled. The actual calculation is conducted statistically based on brightness and repetition patterns of the image.

The pieces of signal data stored in the hue, saturation and lightness image memories of the hue/saturation/lightness transform part 32 are sent also to the gloss calculating part 34 to form a gloss image composed of data that represents the gloss value all over the frame. The gloss image is stored in a 2D gloss distribution memory and is fed therefrom to the next-stage gloss feature calculating part 44 to calculate the gloss feature δ. The gloss feature δ of a large value is obtained from image data of glossy cloth. The image data of dull cloth such as wool or cotton provides a small numerical value. The gloss value is sent to the data fusion part 51 of the color sense analysis part 5, wherein it is fused together with other data, and the fused data is fed therefrom to the judge circuit 52. The gloss value is sent also to the display processing circuit 61 of the image processing/display section 6, wherein it is properly processed for display, and the processed results are display in the form of a bar graph or the like on the display 62.

The gloss degree feature value or characteristic amount is a value that is mathematically obtained, as the degree of shine or sheen, in the gloss feature calculating part 44 on the basis of the degree of the gloss distribution, or the degree or directionality of the intensity distribution. Accordingly, the calculation for the gloss feature is statistical. Further, the gloss value is one that is theoretically proposed by the inventor of the present invention; no exact definition has been given in the art. In practice, the gloss value (the degree of shine) of an object image is mathematically expressed and the gloss all over the image is calculated to obtain a gloss image.

The pieces of data stored in the hue, saturation and lightness image memories of the hue/saturation/lightness transform part 32 are provided also to the texture degree calculating part 42, wherein the hue, saturation and lightness texture values μh, μc and μl are calculated, and they are stored in the registers corresponding to them, respectively.

The hue, saturation and lightness texture values are numerical ones that express complexity of a fabric through utilization of the regularity of their change. These texture values are fused together in the data fusion part 51 of the color sense analysis section 5 and the fused data is sent to the judge circuit 52. At the same time, these texture values are sent also to the display processing circuit 61 of the image processing/display part 6, wherein they are subjected to proper processing for display, and the processed results are display in the form of a bar graph or the like on the display 62. The texture value is a quantity indicating the "texture" of the DUT surface, but no clear definition has been given of this value either. In this specification, the number of repetitions and complexity of the surface pattern of the DUT are expressed by a numerical value obtained through calculation—this numerical value is called a texture value. In practice, the texture value is statistically calculated and mathematical formulae and other concrete conditions for the statistical calculation are suitably selected.

The data fusion part 51 of the color sense analysis section 5 assigns certain weights to the individual features, fractals and texture values and adds them together. The judge circuit 52 is a circuit which judges, for example, that the DUT is silk or wool when the added result is in the range of between 1 and 2 or 2 and 3. As mentioned above, the color sense analysis section 5 combines and fuses the respective features and the fractals and texture values into a statistic. The individual features are assigned certain weights and added together, and mathematical formulae and other concrete conditions for the statistic calculation are suitably selected.

The data fusion and the judgement based on the fused data will be described in more concrete terms. As referred to above, the cloth of a textile can be recognized or judged by fusing the features and the fractals and texture values. For example, it can be judged whether the cloth is made from silk or wool. The silk and wool has such features as shown below in Table 1.

TABLE 1

|  | Silk | Wool |
|---|---|---|
| Texture | fine | coarse |
| Material | thin | thick |
| Frayed Spot | few | many |
| Gloss | glossy | dull |
| Luster | lustrous | dull |
| Transparency | high | low |

The power feature, fractals, gloss and texture values corresponding to the above features are given in Tables 2 through 7 shown below.

TABLE 2

|  | Silk | Wool |
|---|---|---|
| Texture | fine | coarse |
| Power feature value | High in high-frequency energy | Low in high-frequency energy |
| Texture value | large | small |
| Fractals value | large | small |

TABLE 3

|  | Silk | Wool |
|---|---|---|
| Material | thin | thick |
| Power feature value | High in high-frequency energy | Low in high-frequency energy |

TABLE 3-continued

|  | Silk | Wool |
|---|---|---|
| Texture value | large | small |
| Fractals value | large | small |

TABLE 4

|  | Silk | Wool |
|---|---|---|
| Frayed spot | few | many |
| Power feature value | High in high-frequency energy | Low in high-frequency energy |
| Texture value | large | small |
| Fractals value | large | small |

TABLE 5

|  | Silk | Wool |
|---|---|---|
| Gloss | glossy | dull |
| Gloss value | large | small |
| Lightness power feature | large | small |

TABLE 6

|  | Silk | Wool |
|---|---|---|
| Luster | lustrous | dull |
| Lightness power feature | large | small |

TABLE 7

|  | Silk | Wool |
|---|---|---|
| Transparency | high | low |
| Lightness power value | large | small |
| Saturation power feature | small | large |

Thus, the cloth of the textile under test can be judged by combining these power features, fractals, gloss and texture values. In this example, it can be judged whether the cloth is wool or silk. While the power feature, fractals, gloss and texture values have been described as examples of feature values, an increase in the number of kinds of the feature values would permit more precise judgement of cloth.

Further, the measurement control section 7 and the information processing section 8 respectively control the entire color sense measuring device and perform necessary processing via control lines and information parameter lines not shown.

As will be appreciated from the above, the conventional color sense measurements by visual inspection and by the use of the photoelectric tube have the problem that the results of measurement vary with individual operators and measuring environments and are affected by such conditions as the surface condition and size of the DUT and the manner in which it is arranged with a sample. The color sense measuring device of the present invention permits a highly accurate measurement of the color sense a person perceives about the DUT surface by colorimetry techniques and a highly accurate absolute value measurement of the color sense. It is also possible to specify the material of the DUT by a color sense analysis algorithm and image processing software.

In the color sense measuring device according to the present invention, the registers can be housed in the calculating or display section. The color sense measuring device of the present invention can be constructed by a chromaticity distribution transform section, a 2D memory, a 3D CIE chromaticity diagram histogram generating part, and a display part. The color sense measuring device may be added with a structure which uses a temperature sensor and a humidity sensor to monitor and record environmental conditions during measurement of the color sense. A plurality of solid-state cameras may be provided in the image input section. Furthermore, a compensating device may also be provided so that the color sense can be measured even under daylight and arbitrary light in the same way as under the standard white light condition.

EFFECTS OF THE INVENTION

As described above, the conventional color sense measurements through visual inspection and by the use of the photoelectric tube inherently have the problems that there are differences in the results of measurement between individuals or operators, differences of the measuring environments result in different results of measurement, and the results of measurement are also affected by such conditions as the surface condition of a DUT, the size of a DUT, the arrangement of a DUT or the like. On the other hand, using the color sense measuring device according to the present invention, it is possible to carry out with higher accuracy a colorimetric measurement of the color sense of a DUT that a person perceives as well as a measurement in absolute value of the color sense of a DUT that a person perceives. In addition, it is also possible to specify a quality of the material of a DUT itself by the color sense analysis algorithm and the image processing software.

Moreover, the use of the standard white light source as the input light source reduces the influence due to the measuring environment, and by monitoring the environmental conditions on measuring a DUT with a temperature sensor and a humidity sensor, the data of the environmental conditions on the DUT during the measurement thereof can be grasped, and hence it is possible to perform the measurement in absolute value of the color sense with a high accuracy on the basis of the data of the environmental conditions.

What is claimed is:

1. A color sense measuring device comprising:
    an input section comprising:
        a solid-state camera taking an image of an object to be measured, and
        a frame memory storing output information from said solid-state camera;
    a color sense measuring section comprising a hue/saturation/lightness transform part, a 2D fast Fourier transformation part, and a gloss degree calculating part and transforming the output information of said solid-state camera transmitted from said frame memory of said input section into hue image information, saturation image information and lightness image information used in measuring the color sense of said object to be measured and outputting them;
    a feature extract/quantification section extracting a feature value used in measuring the color sense of said object on the basis of the image information outputted from said color sense measuring section;
    a color sense analysis section judging the color sense of the quality of the material of said object on the basis of the feature information outputted from said feature extract/quantification section; and
    an image processing/display section processing the feature information outputted from said feature extract/quantification section and displaying the processed results.

2. The device according to claim 1 wherein said color sense measuring section further comprises a chromaticity distribution transform part and a 3D CIE chromaticity diagram histogram generating part.

3. The device according to claim 1 wherein said feature extract/quantification section comprises: a power feature value calculating part for extracting a power feature value from the output information of said 2D fast Fourier transformation part; a fractals degree calculating part for extracting a fractals degree from the output information of said hue/saturation/lightness transform part; a gloss degree feature value calculating part for extracting a gloss degree from the output information of said hue/saturation/lightness transform part; and a texture degree calculating part for extracting a texture degree from the output information of said hue/saturation/lightness transform part.

4. A color sense measuring device comprising:
    an input section comprising:
        a solid-state camera taking an image of an object to be measured, and
        a frame memory storing output information from said solid-state camera;
    a color sense measuring section comprising:
        a hue/saturation/lightness transform part transforming the output information of said solid-state camera transmitted from said frame memory of said input section into 2D hue image information, 2D saturation image information and 2D lightness image formation used in measuring the color sense of said object to be measured and outputting them,
        a 2D fast Fourier transformation part performing 2D fast Fourier transformation processing on the respective 2D hue image information, 2D saturation image information and 2D lightness image information, to thereby obtain 2D hue power spectrum, 2D saturation power spectrum and 2D lightness power spectrum, respectively, and
        a gloss degree calculating part calculating a 2D gloss degree distribution image from the 2D hue image information, 2D saturation image information and 2D lightness image information;
    a feature extract/quantification section of extracting feature values used in measuring the color sense of said object on the basis of the image information outputted from said color sense measuring section;
    a color sense analysis section judging the color sense of the quality of the material of said object on the basis of the feature value information outputted from said feature extract/quantification section; and
    an image processing/display section processing the feature value information outputted from said feature extract/quantification section and displaying the processed results.

5. The device according to claim 4, wherein said color sense measuring section further comprises a chromaticity distribution transform part and a 3D CIE (Commission Internationale de L'Eclairage) chromaticity diagram histogram generating part.

6. The device according to claim 4 wherein said feature extract/quantification section comprises:
    a power feature value calculating part calculating a hue power feature value, a saturation power feature value, and a lightness power feature value from said 2D hue power spectrum, 2D saturation power spectrum and 2D lightness power spectrum of said 2D fast Fourier transformation part, respectively;

a fractals degree calculating part calculating a hue fractals degree, a saturation fractals degree, and a lightness fractals degree from the 2D hue image information, 2D saturation image information and 2D lightness image information of said hue/saturation/lightness transform part, respectively;

a gloss degree feature value calculating part for calculating a gloss degree feature value from the 2D gloss degree distribution image of said gloss degree calculating; and a texture degree calculating part for extracting a hue texture degree, a saturation texture degree, and a lightness texture degree from the 2D hue image information, 2D saturation image information and 2D lightness image information of said hue/saturation/lightness transform part, respectively.

7. The device according to claim 5 wherein said feature extract/quantification section comprises:

a power feature value calculating part calculating a hue power feature value, a saturation power feature value, and a lightness power feature value from said 2D hue power spectrum, 2D saturation power spectrum and 2D lightness power spectrum of said 2D fast Fourier transformation part, respectively;

a fractals degree calculating part calculating a hue fractals degree, a saturation fractals degree, and a lightness fractals degree from the 2D hue image information, 2D saturation image information and 2D lightness image information of said hue/saturation/lightness transform part, respectively;

a gloss degree feature value calculating part for calculating a gloss degree feature value from the 2D gloss degree distribution image of said gloss degree calculating; and a texture degree calculating part for extracting a hue texture degree, a saturation texture degree, and a lightness texture degree from the 2D hue image information, 2D saturation image information and 2D lightness image information of said hue/saturation/lightness transform part, respectively.

8. The color sense measuring device according to claim 4, which further comprises a measurement control section and an information processing section.

* * * * *

UNITED STATES PATENT AND TRADEMARK OFFICE
CERTIFICATE OF CORRECTION

PATENT NO.    : 5,917,541
DATED         : June 29, 1999
INVENTOR(S)   : Kouji Nakagome, et al.

Page 1 of 1

It is certified that error appears in the above-identified patent and that said Letters Patent is hereby corrected as shown below:

Column 11,
Line 14, after "lating" insert -- part --

Column 12,
Line 14, after "lating" insert -- part --

Signed and Sealed this

Thirty-first Day of July, 2001

*Attest:*

NICHOLAS P. GODICI
*Attesting Officer*     *Acting Director of the United States Patent and Trademark Office*